US012572322B2

(12) United States Patent
Duan et al.

(10) Patent No.: US 12,572,322 B2
(45) Date of Patent: Mar. 10, 2026

(54) VOICE PROMPT SYSTEM, VOICE PROMPT METHOD FOR BRIDGE GIRDER ERECTION UNIT, COMPUTING DEVICE, AND MEDIUM

(71) Applicant: China Tiesiju Civil Engineering Group Co., Ltd., Hefei (CN)

(72) Inventors: Qinan Duan, Hefei (CN); Xi Li, Hefei (CN); Yuhu Pei, Hefei (CN); Xuesen Du, Hefei (CN); Daocheng Wang, Hefei (CN); Yutao Deng, Hefei (CN); Yunhao Li, Hefei (CN); Wei Wen, Hefei (CN); Linfu Liu, Hefei (CN); Yusong Wu, Hefei (CN); Jinjun Ge, Hefei (CN); Mingxiang Ge, Hefei (CN)

(73) Assignee: China Tiesiju Civil Engineering Group Co., Ltd., Hefei (CN)

( * ) Notice: Subject to any disclaimer, the term of this patent is extended or adjusted under 35 U.S.C. 154(b) by 177 days.

(21) Appl. No.: 18/243,006

(22) Filed: Sep. 6, 2023

(65) Prior Publication Data

US 2024/0220187 A1 Jul. 4, 2024

(30) Foreign Application Priority Data

Jan. 3, 2023 (CN) .......................... 202310002603.4

(51) Int. Cl.
*G08B 3/10* (2006.01)
*E01D 21/00* (2006.01)
*G06F 3/16* (2006.01)
(52) U.S. Cl.
CPC ............. *G06F 3/165* (2013.01); *E01D 21/00* (2013.01)

(58) Field of Classification Search
CPC . A61B 5/0022; A61B 5/0205; A61B 5/02438; A61B 5/14551; A61B 5/681; A61B 5/7221; A61B 5/7275; A61B 5/746; A61B 5/7475; A61B 2560/0228; A61B 5/0261; A61B 5/282; A61B 5/291; A61B 5/366; A61B 5/6803; A61B 5/7203; A61B 5/721; A61B 5/7264; A61B 5/7282; A61B 2562/0219; A61B 5/0024; A61B 5/01;
(Continued)

(56) References Cited

U.S. PATENT DOCUMENTS 4,202,453 A * 5/1980 Wilkes, Jr. ............ E21F 13/006
                                                     212/196
4,473,452 A * 9/1984 Cantor ............. G01N 27/44773
                                                     204/458
(Continued)

*Primary Examiner* — Daniel Previl

(57) ABSTRACT

The present disclosure provides a voice prompt system, a voice prompt method for a bridge girder erection unit, a computing device, and a medium. The voice prompt system includes a control circuit and an alarm circuit; the control circuit includes a control power supply, a programmable controller, and relays; the positive electrode of the control power supply is electrically connected with an input end of the programmable controller, an output end of the programmable controller is electrically connected with input ends of the at least two relays, respectively, and output ends of the relays are connected to the negative electrode of the control power supply after being connected in parallel; the alarm circuit includes relay contacts, a wiring terminal block, and an alarm; the wiring terminal block includes at least two high-potential pins and a low-potential pin.

10 Claims, 2 Drawing Sheets

Switching power supply-G1

Alarm

(58) Field of Classification Search

CPC . A61B 5/02055; A61B 5/021; A61B 5/02416; A61B 5/0245; A61B 5/0816; A61B 5/1112; A61B 5/14532; A61B 5/486; A61B 5/6824; A61B 5/7455; G16H 40/63; G16H 10/60; G16H 20/60; G16H 40/67; G16H 50/30; H04L 41/0654; H04L 69/40; H04W 4/90; Y04S 40/00; A63F 13/61; A63F 13/67; A63F 13/80; B60B 11/10; B60B 19/00; B60B 2900/711; B60B 2900/731; B60L 53/126; B60L 53/32; B60Y 2400/11; B60Y 2400/30; B60Y 2200/00; B60Y 2300/00; B60Y 2302/00; B60Y 2306/00; B60Y 2304/00; B60Y 2400/00; B60Y 2410/00; E01D 21/00; E01D 1/00; E01D 2/00; E01D 4/00; E01D 6/00; E01D 11/00; E01D 12/00; E01D 15/00; E01D 18/00; E01D 19/00; E01D 22/00; E01D 2101/00; F03G 7/122; F03G 3/00; F03G 1/00; F03G 4/00; F03G 5/00; F03G 6/00; F03G 7/00; G01C 21/343; G01R 19/16571; G06F 3/011; G06F 3/165; G06Q 2220/00; G06Q 30/018; G06Q 30/0251; G06Q 50/01; G06T 19/20; H02K 53/00; H04Q 3/00; H04Q 1/00; H04Q 5/00; H04Q 9/00; H04Q 11/00; H04Q 2201/00; H04Q 2209/00; H04Q 2213/00; Y02P 90/02; Y02T 10/70; Y02T 10/7072; Y02T 90/12; Y02T 90/14; Y02T 10/00; Y02T 30/00; Y02T 50/00; Y02T 70/00; Y02T 90/00

USPC .......... 340/384.1, 995.17, 428–429, 995.25, 340/995.28, 426.3, 426.31, 426.32, 453, 340/466

See application file for complete search history.

(56) References Cited

U.S. PATENT DOCUMENTS

| | | | |
|---|---|---|---|
| 6,088,616 A * | 7/2000 | Olson | A61N 1/3925 |
| | | | 607/59 |
| 8,164,343 B2 * | 4/2012 | Bertness | G01R 31/006 |
| | | | 324/543 |
| 2008/0091793 A1 * | 4/2008 | Diroo | H04L 65/40 |
| | | | 709/217 |
| 2008/0211658 A1 * | 9/2008 | Oppelt | G08B 25/04 |
| | | | 340/506 |
| 2013/0054863 A1 * | 2/2013 | Imes | H04L 12/2827 |
| | | | 709/223 |

* cited by examiner

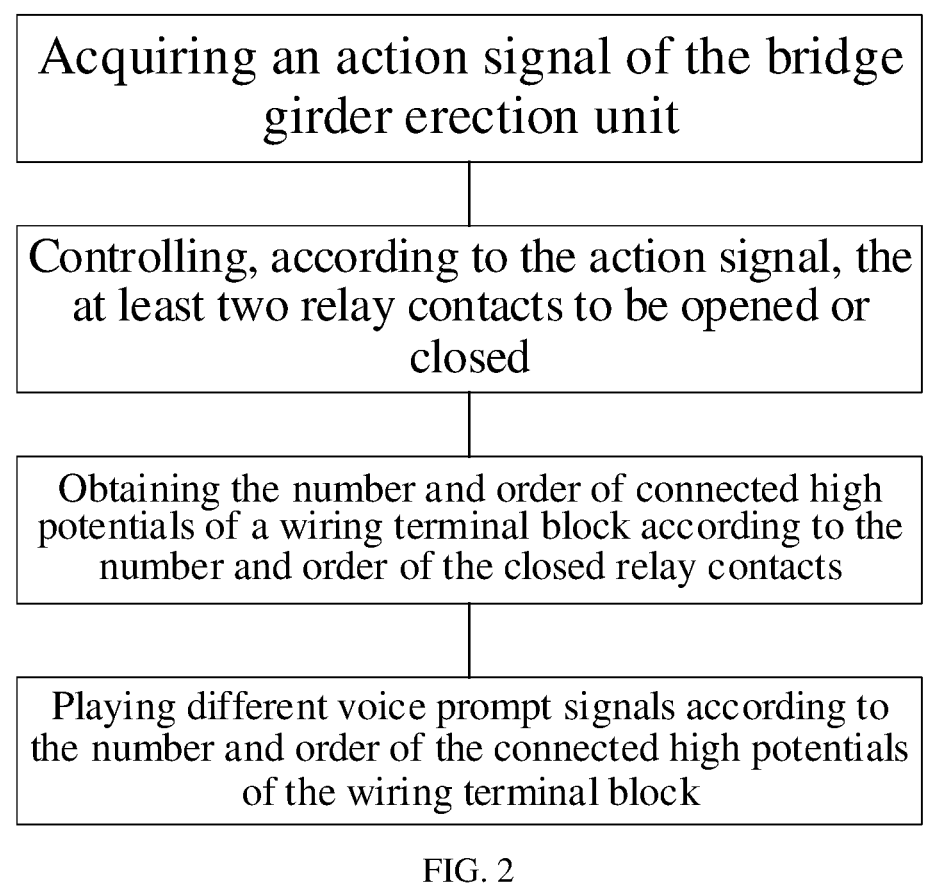

Acquiring an action signal of the bridge
girder erection unit

Controlling, according to the action signal, the
at least two relay contacts to be opened or
closed Obtaining the number and order of connected high
potentials of a wiring terminal block according to the
number and order of the closed relay contacts Playing different voice prompt signals according to
the number and order of the connected high potentials
of the wiring terminal block

FIG. 2

VOICE PROMPT SYSTEM, VOICE PROMPT METHOD FOR BRIDGE GIRDER ERECTION UNIT, COMPUTING DEVICE, AND MEDIUM

CROSS-REFERENCE TO RELATED APPLICATION

This application claims priority from the Chinese patent application 202310002603.4 filed Jan. 3, 2023, the content of which is incorporated herein in the entirety by reference.

TECHNICAL FIELD

The present disclosure relates to the technical field of bridge girder erection unit control, in particular to a voice prompt system, a voice prompt method for a bridge girder erection unit, a computing device, and a medium.

BACKGROUND ART

A bridge girder erection unit includes a bridge girder erection machine and a girder transportation vehicle. The bridge girder erection machine is a device for placing prefabricated girder sheets on a prefabricated pier. The bridge girder erection machine falls within the scope of a crane due to its main function that the girder sheets are lifted and then laid down after being transported in place. The girder transportation vehicle is a special-purpose vehicle matched with the bridge girder erection machine to transport bridge girder sheets.

An alarm system of an existing bridge girder erection unit has defects of single sound and no difference in the construction action alarm prompt. Thus, it is easy to cause a situation that the commanding and operating personnel are unable to identify a construction action within the first time, there is a hidden danger of mis-operation, and therefore, there is a possibility that the girder transportation vehicle collides with the bridge girder erection machine or the bridge girder erection machine overturns.

SUMMARY

A problem to be solved by the present disclosure is how to send different voice prompts according to different construction conditions.

In order to solve the above-mentioned problem, the present disclosure provides a voice prompt system for a bridge girder erection unit, including a control circuit and an alarm circuit;

the control circuit including a control power supply, a programmable controller, and at least two relays; the positive electrode of the control power supply being electrically connected with an input end of the programmable controller, an output end of the programmable controller being electrically connected with input ends of the at least two relays, respectively, and output ends of the at least two relays being connected to the negative electrode of the control power supply after being connected in parallel;

the alarm circuit including relay contacts, a wiring terminal block, and an alarm; the number of the relay contacts being equal to the number of the relays, the wiring terminal block including at least two high-potential pins and a low-potential pin, one end of the at least two relay contacts being connected to the low-potential pin of the wiring terminal block after being connected in series, the other ends of the relay contacts being connected to the high-potential pins of the wiring terminal block, respectively, and the alarm being connected with the wiring terminal block and being used for sending different voice prompts according to potential signals of the different pins of the wiring terminal block.

The present disclosure has the beneficial effects that the programmable controller and the relays are disposed in the control circuit, the programmable controller is connected with the at least two relays, and the at least two relays correspondingly control the at least two relay contacts, so that the programmable controller can control the connection or disconnection of the at least two relay contacts, and then control the connection or disconnection of the at least two high-potential pins on the wiring terminal block, and thus, different arrangements and combinations of the connected high potentials can be formed, wherein n represents the number of the relays or the relay contacts. By such arrangements and combinations of the connected high potentials, the alarm is controlled to send different voice prompt signals, respectively, then, the programmable controller can be controlled according to different construction conditions to control the connection or disconnection of the at least two relay contacts, the combinations and order of the different connected high potentials are formed on the wiring terminal block, and then, different voice signals are formed, which provides convenience for operating personnel to determine the different construction conditions according to the different voice prompts.

Optionally, the control power supply is a 24V direct-current power supply.

Optionally, the programmable controller is a PLC.

The present disclosure further provides a voice prompt method for a bridge girder erection unit, based on the above-mentioned voice prompt system for the bridge girder erection unit, and including: acquiring an action signal of the bridge girder erection unit; controlling, according to the action signal, the at least two relay contacts to be opened or closed; obtaining the number and order of connected high potentials of a wiring terminal block according to the number and order of the closed relay contacts; and playing different voice prompt signals according to the number and order of the connected high potentials of the wiring terminal block.

The voice prompt method for the bridge girder erection unit is in the present disclosure is based on the above-mentioned voice prompt system for the bridge girder erection unit. The action signal of the bridge girder erection unit is acquired; the at least two relay contacts are controlled to be opened or closed according to the action signal, and thus, the number of closed relay contacts and the number of opened relay contacts are obtained; the number and order of the connected high potentials of the wiring terminal are obtained according to the number and order of the closed relay contacts; and the different voice prompt signals are played according to the different number of the connected high potentials of the wiring terminal block. Therefore, the different voice prompt signals can be played according to different action signals of the bridge girder erection unit, thereby facilitating prompting a working state of the bridge girder erection unit to field personnel.

Optionally, the action signal of the bridge girder erection unit includes a front vehicle winch overspeed signal, and said acquiring an action signal of the bridge girder erection unit includes: acquiring a speed of the front vehicle winch;

and when the speed of the front vehicle winch is greater than a first preset threshold, sending the front vehicle winch overspeed signal.

Optionally, the action signal of the bridge girder erection unit includes a front vehicle winch rising signal, and said acquiring an action signal of the bridge girder erection unit includes: acquiring a state of a caliper disc proximity switch, a frequency converter operation potential, a front vehicle winch relay contact potential, a front vehicle winch caliper disc braking potential, a frequency converter forward rotation potential, and a front vehicle winch fan braking potential; and when the caliper disc proximity switch is turned on and the frequency converter operation potential, the front vehicle winch relay contact potential, the front vehicle winch caliper disc braking potential, the frequency converter forward rotation potential and the front vehicle winch fan braking potential are all high potentials, sending the front vehicle winch rising signal.

Optionally, the action signal of the bridge girder erection unit includes a front vehicle running motor advancing signal, and said acquiring an action signal of the bridge girder erection unit includes: acquiring a running braking power supply potential, a frequency converter operation potential, a front vehicle running relay contact potential, and a front running motor fan braking potential; and when the running braking power supply potential, the frequency converter operation potential, the front vehicle running relay contact potential and the front running motor fan braking potential are all high potentials, sending the front vehicle running motor advancing signal.

Optionally, the action signal of the bridge girder erection unit includes a frequency converter fault signal, and said acquiring an action signal of the bridge girder erection unit includes: acquiring a frequency converter fault potential; and when the frequency converter fault potential is a high potential, sending the frequency converter fault signal.

The present disclosure further provides a computing device, including a memory, a processor, and a computer program stored in the memory and capable of running on the processor, and the above-mentioned voice prompt method for the bridge girder erection unit being implemented when the program is executed by the processor.

The computing device provided by the present disclosure and the above-mentioned voice prompt method for the bridge girder erection unit have the same advantages as comparison with the prior art so as not to be repeated herein.

The present disclosure further provides a computer-readable storage medium, having a computer program stored thereon, wherein the above-mentioned voice prompt method for the bridge girder erection unit is implemented when the computer program is executed by a processor.

The computer-readable storage medium provided by the present disclosure and the above-mentioned voice prompt method for the bridge girder erection unit have the same advantages as comparison with the prior art so as not to be repeated herein.

BRIEF DESCRIPTION OF THE DRAWINGS

FIG. 2 is a flow diagram of a voice prompt method for a bridge girder erection unit in an embodiment of the present disclosure.

DETAILED DESCRIPTION OF THE DISCLOSURE

Figure 1:
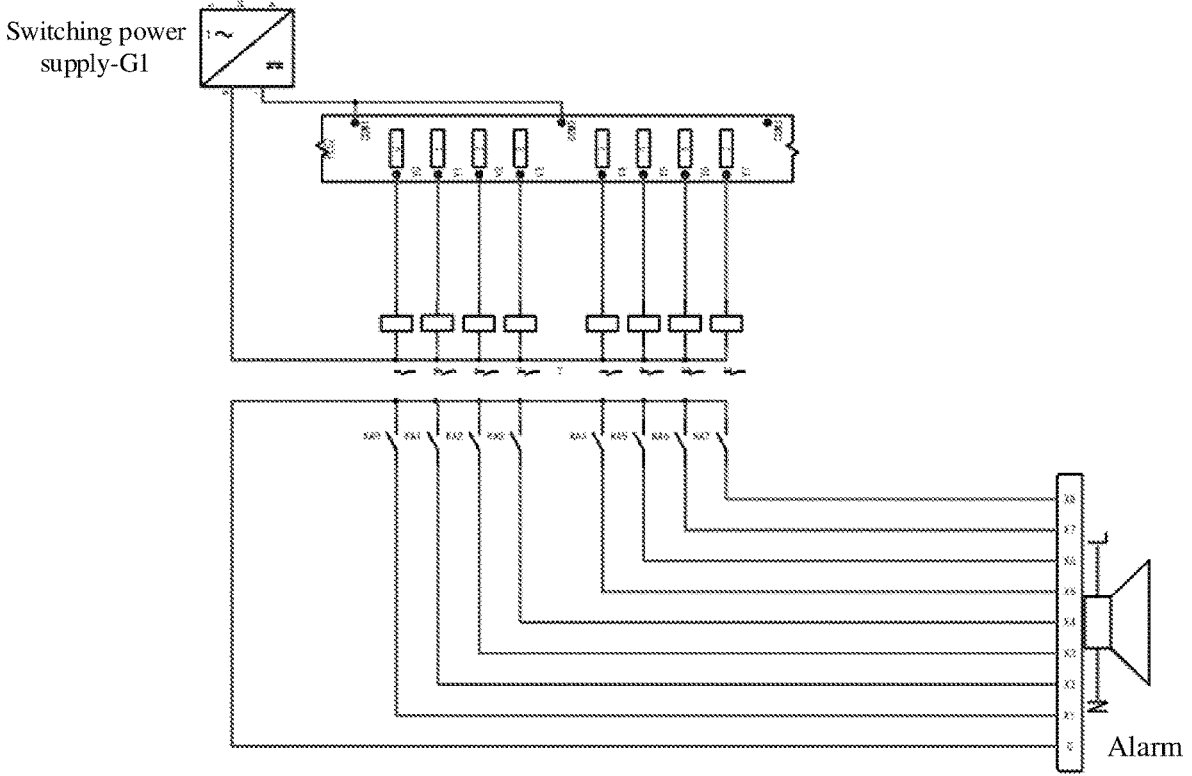
FIG. 1 is a schematic diagram of a voice prompt system for a bridge girder erection unit in an embodiment of the present disclosure.

In order to make above-mentioned objectives, characteristics and advantages of the present disclosure more obvious and comprehensible, specific embodiments of the present disclosure will be described in detail below in conjunction with the accompanying drawings.

It should be noted that terms such as "first" and "second" in the description and claims of the present disclosure and the above-mentioned accompanying drawings are used for distinguishing similar objects, but are unnecessarily used for describing a specific sequential or chronological order. It should be understood that data used in such a way are interchangeable under appropriate circumstances, so that the embodiments of the present disclosure described herein can be implemented in other orders than illustrated or described herein.

In the description of the present description, the description with reference to terms such as "embodiment", "some embodiments" and "optional embodiments" is intended to indicate that specific features, structures, materials or characteristics described in conjunction with the embodiments or implementation are included in at least one embodiment or implementation of the present disclosure. In the present description, the schematic statement for the above-mentioned terms does not necessarily refer to the same embodiment or implementation. Moreover, the described specific features, structures, materials or characteristics may be combined in an appropriate way in any one or more embodiments or implementations.

As shown in FIG. 1, an embodiment of the present disclosure provides a voice prompt system for a bridge girder erection unit, including a control circuit and an alarm circuit; the control circuit including a control power supply, a programmable controller, and at least two relays; the positive electrode of the control power supply being electrically connected with an input end of the programmable controller, an output end of the programmable controller being electrically connected with input ends of the at least two relays, respectively, and output ends of the at least two relays being connected to the negative electrode of the control power supply after being connected in parallel; the alarm circuit including relay contacts, a wiring terminal block, and an alarm; the number of the relay contacts being equal to the number of the relays, the wiring terminal block including at least two high-potential pins and a low-potential pin, one end of the at least two relay contacts being connected to the low-potential pin of the wiring terminal block after being connected in series, the other ends of the relay contacts being connected to the high-potential pins of the wiring terminal block, respectively, and the alarm being connected with the wiring terminal block and being used for sending different voice prompts according to potential signals of the different pins of the wiring terminal block.

According to the present disclosure, the programmable controller and the relays are disposed in the control circuit, the programmable controller is connected with the at least two relays, and the at least two relays correspondingly control the at least two relay contacts, so that the programmable controller can control the connection or disconnection of the at least two relay contacts, and then control the connection or disconnection of the at least two high-potential pins on the wiring terminal block, and thus, different arrangements and combinations of the connected high potentials can be formed, wherein n represents the number of the relays or the relay contacts. By such arrangements and combinations of the connected high potentials, the alarm is controlled to send different voice prompt signals, respectively, then, the programmable controller can be controlled according to different construction conditions to control the connection or disconnection of the at least two relay contacts, the combinations and order of the different connected high potentials are formed on the wiring terminal block, and then, different voice signals are formed, which provides convenience for operating personnel to determine the different construction conditions according to the different voice prompts.

In the present embodiment, in order to facilitate description, eight relay contacts and eight relays are described as examples, but it does not mean that the protection scope of the embodiment of the preset disclosure is limited to the situation that the eight relay contacts and the eight relays are provided.

Specifically, in the present embodiment, the positive electrode of the control power supply is electrically connected with the input end of the programmable controller so as to provide the control power source for the programmable controller, eight output ends of the programmable controller are electrically connected with the input ends of the eight relays, and the relays are used for controlling the connection or disconnection of the eight relay contacts in the alarm circuit. The eight relay contacts are marked as KA0, KA1, KA2, KA3, KA4, KA5, KA6, KA7, and KA8, respectively. One end of the relay contacts is connected to the low-potential pin of the wiring terminal block after being connected in series, and the other ends of the relay contacts are connected to eight high-potential pins of the wiring terminal block, respectively. The eight high-potential pins are respectively marked as X1, X2, X3, X4, X5, X6, X7, and X8. The programmable controller controls the eight relays to be de-energized or energized according to different working states of the bridge girder erection unit, and then controls the connection or disconnection of the relay contacts. The relay contacts are connected with the eight high-potential pins of the wiring terminal block, respectively, and therefore, the connection or disconnection of the high-potential pins on the wiring terminal block can be controlled according to the connection or disconnection of the relay contacts. Then, the alarm is controlled to form the different voice prompt signals according to the connection or disconnection combinations of the eight different high-potential pins.

In some embodiments, a power voltage of the alarm acts on between each of the high-potential pins and the low-potential pin of the wiring terminal block. When a certain relay contact is connected, the corresponding high-potential pin is connected with the low-potential pin, and thus, the potential of the pin becomes a low potential. For example, as shown in FIG. 1, if the relay contact KA0 is closed, the corresponding high-potential pin X1 has the same potential as the low-potential pin G; and if the relay contact KA1 is opened, there is a potential difference between the corresponding high-potential pin X2 and the low-potential pin G.

In some embodiments, the control power supply is a 24V direct-current power supply, the programmable controller is a PLC, and the alarm is an audible and visual alarm.

In the present embodiment, an action state of the bridge girder erection unit and corresponding voice prompt information are exemplarily enumerated as the following table:

| Action state of bridge girder erection unit | Corresponding relay contacts are connected | High-potential pins of the wiring terminal block lose potential differences | The alarm sends a voice prompt |
| --- | --- | --- | --- |
| A front left winch rises | KA0 | X1 | A front vehicle left winch rises |
| A front left winch falls off | KA1 | X2 | A front vehicle left winch falls off |
| A front right winch rises | KA1, KA0 | X2, X1 | A front vehicle right winch rises |
| A front right winch falls off | KA2 | X3 | A front vehicle right winch falls off |
| A front crane winch rises | KA2, KA0 | X3, X1 | A front crane winch rises |
| A front crane winch falls off | KA2, KA1 | X3, X2 | A front crane winch falls off |
| A front left running motor advances | KA2, KA1, KA0 | X3, X2, X1 | A front vehicle left running motor advances |
| A front left running motor retreats | KA3 | X4 | A front vehicle left running motor retreats |
| A front right running motor advances | KA3, KA0 | X4, X1 | A front vehicle right running motor advances |
| A front right running motor retreats | KA3, KA1 | X4, X2 | A front vehicle right running motor retreats |
| A front crane trolley advances | KA3, KA1, KA0 | X4, X2, X1 | A front crane trolley advances |
| A front crane trolley retreats | KA3, KA2 | X4, X3 | A front crane trolley retreats |
| A front left winch overspeed is alarmed | KA3, KA2, KA0 | X4, X3, X1 | A front vehicle left winch overspeed is alarmed |
| A front right winch overspeed is alarmed | KA3, KA2, KA1 | X4, X3, X2 | A front vehicle right winch overspeed is alarmed |

-continued

| Action state of bridge girder erection unit | Corresponding relay contacts are connected | High-potential pins of the wiring terminal block lose potential differences | The alarm sends a voice prompt |
|---|---|---|---|
| A first frequency converter is faulted | KA3, KA2, KA1, KA0 | X4, X3, X2, X1 | A first frequency converter is faulted |
| A second frequency converter is faulted | KA4 | X5 | A second frequency converter is faulted |

According to the embodiment of the present disclosure, the programmable controller and the relays are disposed in the control circuit, the programmable controller is connected with the eight relays, and the eight relays correspondingly control the eight relay contacts, so that the programmable controller can control the connection or disconnection of the eight contacts, and then control the connection or disconnection of the eight high-potential pins on the wiring terminal block, and thus, 256 different arrangements and combinations of the connected high potentials can be formed; and by means of the 256 different arrangements and combinations of the high potentials, the alarm is controlled to send the different voice prompt signals, respectively, then, the programmable controller can be controlled according to different construction conditions to control the connection or disconnection of the eight relay contacts, the combinations of the different connected high potentials are formed on the wiring terminal block, and then, different voice signals are formed, which provides convenience for operating personnel to determine the different construction conditions according to the different voice prompts.

An embodiment of the present disclosure further provides a voice prompt method for a bridge girder erection unit, based on the above-mentioned voice prompt system for the bridge girder erection unit, and including: an action signal of the bridge girder erection unit is acquired; the at least two relay contacts are controlled to be opened or closed according to the action signal; the number and order of connected high potentials of a wiring terminal block are obtained according to the number and order of the closed relay contacts; and different voice prompt signals are played according to the number and order of the connected high potentials of the wiring terminal block.

Specifically, in the present embodiment, the action signal of the bridge girder erection unit includes, but is not limited to winch rising or falling, running motor advancing or retreating, crane trolley advancing or retreating, winch overspeed, and frequency converter faults. In the present embodiment, a plurality of action signals of the bridge girder erection unit may be provided and are set as actually required during actual applications. The at least two relay contacts are controlled to be opened or closed according to the action signal, and after the relay contacts are closed, the high potentials of the wiring terminal block will be connected, that is, the corresponding high-potential pin has the same potential as the low-potential pin. Therefore, the alarm plays the different voice prompt signals according to the number of the connected high potentials of the wiring terminal block.

The voice prompt method for the bridge girder erection unit is in the present disclosure is based on the above-mentioned voice prompt system for the bridge girder erection unit. The action signal of the bridge girder erection unit is acquired; the at least two relay contacts are controlled to be opened or closed according to the action signal, and thus, the number of closed relay contacts and the number of opened relay contacts are obtained; the number and order of the connected high potentials of the wiring terminal are obtained according to the number and order of the closed relay contacts; and the different voice prompt signals are played according to the different number of the connected high potentials of the wiring terminal block. Therefore, the different voice prompt signals can be played according to different action signals of the bridge girder erection unit, thereby facilitating prompting a working state of the bridge girder erection unit to field personnel.

In another optional embodiment of the present disclosure, the action signal of the bridge girder erection unit includes a front vehicle winch overspeed signal, and said step that an action signal of the bridge girder erection unit is acquired includes: a speed of the front vehicle winch is acquired; and when the speed of the front vehicle winch is greater than a first preset threshold, the front vehicle winch overspeed signal is sent.

Specifically, in the present embodiment, the speed of the front vehicle winch may be acquired by a speed sensor or other speed detecting elements, and when it is determined that the speed of the front vehicle winch is greater than the first preset threshold, the front vehicle winch overspeed signal is sent. It should be noted that, in some embodiments, the front vehicle winch may include a plurality of winches, and when it is detected that a speed of one of the plurality of front vehicle winches is greater than the first preset threshold, the front vehicle winch overspeed signal is sent.

In the present embodiment, the winch overspeed signal is sent to the programmable controller by detecting that the front vehicle winch is overspeed, and thus, the corresponding relay contact is controlled to be closed; and a voice prompt signal corresponding to the situation that the relay contact is closed is preset in a system, and therefore, by controlling the corresponding relay contact to be closed, the alarm can be controlled to send a voice signal for prompting front vehicle winch overspeed.

In another optional embodiment of the present disclosure, the action signal of the bridge girder erection unit includes a front vehicle winch rising signal, and said step that an action signal of the bridge girder erection unit is acquired includes: a state of a caliper disc proximity switch, a frequency converter operation potential, a front vehicle winch relay contact potential, a front vehicle winch caliper disc braking potential, a frequency converter forward rotation potential and a front vehicle winch fan braking potential are acquired; and when the caliper disc proximity switch is turned on and the frequency converter operation potential, the front vehicle winch relay contact potential, the front vehicle winch caliper disc braking potential, the frequency converter forward rotation potential and the front vehicle winch fan braking potential are all high potentials, the front vehicle winch rising signal is sent.

Specifically, in the present embodiment, the state of the caliper disc proximity switch, the frequency converter operation potential, the front vehicle winch relay contact potential, the front vehicle winch caliper disc braking potential, the frequency converter forward rotation potential and the front vehicle winch fan braking potential are acquired; and when the caliper disc proximity switch is turned on and the frequency converter operation potential, the front vehicle winch relay contact potential, the front vehicle winch caliper disc braking potential, the frequency converter forward rotation potential and the front vehicle winch fan braking potential are all high potentials, the front vehicle winch rising signal is sent. Therefore, the corresponding relay contact is controlled to be closed, a voice prompt signal corresponding to the situation that the relay contact is closed is preset in a system, and therefore, by controlling the corresponding relay contact to be closed, the alarm can be controlled to send a voice signal for prompting front vehicle winch rising.

In another optional embodiment of the present disclosure, the action signal of the bridge girder erection unit includes a front vehicle running motor advancing signal, and said step that an action signal of the bridge girder erection unit is acquired includes: a running braking power supply potential, a frequency converter operation potential, a front vehicle running relay contact potential and a front running motor fan braking potential are acquired; and when the running braking power supply potential, the frequency converter operation potential, the front vehicle running relay contact potential and the front running motor fan braking potential are all high potentials, the front vehicle running motor advancing signal is sent.

Specifically, in the present embodiment, the running braking power supply potential, the frequency converter operation potential, the front vehicle running relay contact potential and the front running motor fan braking potential are acquired; and when the running braking power supply potential, the frequency converter operation potential, the front vehicle running relay contact potential and the front running motor fan braking potential are all high potentials, the front vehicle running motor advancing signal is sent. Therefore, the corresponding relay contact is controlled to be closed, a voice prompt signal corresponding to the situation that the relay contact is closed is preset in a system, and therefore, by controlling the corresponding relay contact to be closed, the alarm can be controlled to send a voice signal for prompting front vehicle running motor advancing.

In another optional embodiment of the present disclosure, the action signal of the bridge girder erection unit includes a frequency converter fault signal, and said step that an action signal of the bridge girder erection unit is acquired includes: a frequency converter fault potential is acquired; and when the frequency converter fault potential is a high potential, the frequency converter fault signal is sent.

Specifically, in the present embodiment, the frequency converter fault potential is acquired; and when the frequency converter fault potential is a high potential, the frequency converter fault signal is sent. Therefore, the corresponding relay contact is controlled to be closed, a voice prompt signal corresponding to the situation that the relay contact is closed is preset in a system, and therefore, by controlling the corresponding relay contact to be closed, the alarm can be controlled to send a voice signal for prompting frequency convert faults.

The present disclosure further provides a computing device, including a memory, a processor, and a computer program stored in the memory and capable of running on the processor, and the above-mentioned voice prompt method for the bridge girder erection unit being implemented when the program is executed by the processor.

The computing device provided by the present disclosure and the above-mentioned voice prompt method for the bridge girder erection unit have the same advantages as comparison with the prior art so as not to be repeated herein.

The present disclosure further provides a computer-readable storage medium, having a computer program stored thereon, wherein the above-mentioned voice prompt method for the bridge girder erection unit is implemented when the computer program is executed by a processor.

The computer-readable storage medium provided by the present disclosure and the above-mentioned voice prompt method for the bridge girder erection unit have the same advantages as comparison with the prior art so as not to be repeated herein.

Although the present disclosure is disclosed as above, the protection scope of the present disclosure is not limited thereto. Various alterations and modifications can be made by the skilled in the art without departing from the spirit and scope of the present disclosure, and these alterations and modifications fall within the protection scope of the present disclosure.

The invention claimed is:

1. A voice prompt system, comprising a control circuit and an alarm circuit;

the control circuit comprising a control power supply, a programmable controller, and at least two relays; a positive electrode of the control power supply being electrically connected with an input end of the programmable controller, an output end of the programmable controller being electrically connected with input ends of the at least two relays, respectively, and output ends of the at least two relays being connected to a negative electrode of the control power supply after being connected in parallel;

the alarm circuit comprising relay contacts, a wiring terminal block, and an alarm; the number of the relay contacts being equal to the number of the relays, the wiring terminal block comprising at least two high-potential pins and a low-potential pin, one end of the at least two relay contacts being connected to the low-potential pin of the wiring terminal block after being connected in series, the other ends of the relay contacts being connected to the high-potential pins of the wiring terminal block, respectively, and the alarm being connected with the wiring terminal block and being used for sending different voice prompts according to potential signals of the different pins of the wiring terminal block.

2. The voice prompt system according to claim 1, wherein the control power supply is a 24V direct-current power supply.

3. The voice prompt system according to claim 1, wherein the programmable controller is a PLC.

4. A voice prompt method for a bridge girder erection unit, based on the voice prompt system according to claim 1, comprising:

acquiring an action signal of the bridge girder erection unit;

controlling, according to the action signal, the at least two relay contacts to be opened or closed;

US 12,572,322 B2

11 obtaining the number and order of connected high potentials of a wiring terminal block according to the number and order of the closed relay contacts; and playing different voice prompt signals according to the number and order of the connected high potentials of the wiring terminal block.

5. The voice prompt method for the bridge girder erection unit according to claim 4, wherein the action signal of the bridge girder erection unit comprises a front vehicle winch overspeed signal, and said acquiring an action signal of the bridge girder erection unit comprises:

acquiring a speed of the front vehicle winch; and when the speed of the front vehicle winch is greater than a first preset threshold, sending the front vehicle winch overspeed signal.

6. The voice prompt method for the bridge girder erection unit according to claim 4, wherein the action signal of the bridge girder erection unit comprises a front vehicle winch rising signal, and said acquiring an action signal of the bridge girder erection unit comprises:

acquiring a state of a caliper disc proximity switch, a frequency converter operation potential, a front vehicle winch relay contact potential, a front vehicle winch caliper disc braking potential, a frequency converter forward rotation potential, and a front vehicle winch fan braking potential; and when the caliper disc proximity switch is turned on and the frequency converter operation potential, the front vehicle winch relay contact potential, the front vehicle winch caliper disc braking potential, the frequency converter forward rotation potential and the front vehicle winch fan braking potential are all high potentials, sending the front vehicle winch rising signal.

7. The voice prompt method for the bridge girder erection unit according to claim 4, wherein the action signal of the bridge girder erection unit comprises a front vehicle running motor advancing signal, and said acquiring an action signal of the bridge girder erection unit comprises:

acquiring a running braking power supply potential, a frequency converter operation potential, a front vehicle running relay contact potential, and a front running motor fan braking potential; and when the running braking power supply potential, the frequency converter operation potential, the front vehicle running relay contact potential and the front running motor fan braking potential are all high potentials, sending the front vehicle running motor advancing signal.

8. The voice prompt method for the bridge girder erection unit according to claim 4, wherein the action signal of the bridge girder erection unit comprises a frequency converter fault signal, and said acquiring an action signal of the bridge girder erection unit comprises:

acquiring a frequency converter fault potential; and when the frequency converter fault potential is a high potential, sending the frequency converter fault signal.

9. The voice prompt method of claim 4, wherein the control power supply is a 24V direct-current power supply.

10. The voice prompt method of claim 4, wherein the programmable controller is a PLC.

* * * * *